(12) United States Patent
Sheu

(10) Patent No.: US 7,961,816 B2
(45) Date of Patent: Jun. 14, 2011

(54) DEVICE FOR AND METHOD OF SIGNAL SYNCHRONIZATION IN A COMMUNICATION SYSTEM

(75) Inventor: Chorng-Ren Sheu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 847 days.

(21) Appl. No.: 11/946,749

(22) Filed: Nov. 28, 2007

(65) Prior Publication Data
US 2009/0135977 A1 May 28, 2009

(51) Int. Cl.
*H04L 7/00* (2006.01)

(52) U.S. Cl. ........ 375/316; 375/326; 375/339; 375/340; 375/342; 375/343; 375/344; 375/354; 375/362; 30/208

(58) Field of Classification Search .......... 375/260, 375/371, 362, 259, 316, 339–343, 354; 370/206, 370/208, 343, 503
See application file for complete search history.

(56) References Cited

U.S. PATENT DOCUMENTS

| | | | | |
|---|---|---|---|---|
| 5,732,113 | A * | 3/1998 | Schmidl et al. | 375/355 |
| 6,058,101 | A * | 5/2000 | Huang et al. | 370/208 |
| 6,097,770 | A * | 8/2000 | Bahai et al. | 375/343 |
| 6,266,361 | B1 * | 7/2001 | Huang et al. | 375/140 |
| 7,072,289 | B1 | 7/2006 | Yang et al. | |
| 7,505,523 | B1 * | 3/2009 | Lee et al. | 375/260 |
| 7,529,179 | B1 * | 5/2009 | Lee et al. | 370/208 |
| 7,613,104 | B2 * | 11/2009 | Bhatt et al. | 370/208 |
| 7,693,039 | B2 * | 4/2010 | Roh et al. | 370/208 |
| 7,733,971 | B2 * | 6/2010 | Roh et al. | 375/260 |
| 7,746,760 | B2 * | 6/2010 | Vijayan et al. | 370/206 |
| 2005/0281290 | A1 | 12/2005 | Khandekar et al. | |
| 2006/0209927 | A1 | 9/2006 | Khandekar et al. | |

FOREIGN PATENT DOCUMENTS
CN 1677909 A 10/2005

OTHER PUBLICATIONS

Tang et al., "Synchronization Schemes for Packet OFDM System," *IEEE International Conference on Communications*, vol. 5, pp. 3346-3350, May 11-15, 2003.
Wang et al., "A Combined Code Acquisition and Symbol Timing Recovery Method for TDS-OFDM," *IEEE Transactions on Broadcasting*, vol. 49, No. 3, pp. 304-308, Sep. 2003.
Yang et al., "Code Acquisition and Symbol Timing Recovery Method in TDS-OFDM for Broadcast Channels," *The 14th IEEE 2003 International Symposium on Personal, Indoor and Mobile Radio Communication Proceedings*, pp. 366-370, Sep. 2003.

* cited by examiner

*Primary Examiner* — Chieh M Fan
*Assistant Examiner* — Sophia Vlahos
(74) *Attorney, Agent, or Firm* — Alston & Bird LLP

(57) ABSTRACT

A device for signal synchronization in a communication system is configured to perform a first sliding correlation for a received signal and a pseudo-random noise (PN) sequence to obtain information on symbol timing, identify a fractional carrier frequency offset (FCFO) using the information on symbol timing and the cyclic extension property of the PN guard interval (GI), and provide a first product by multiplying the received signal with the FCFO. The device is also configured to provide a set of second products by multiplying the first product with each of a set of phases related to integral carrier frequency offsets (ICFOs), perform a second sliding correlation for the PN sequence and each one of the set of the second products to thereby provide a set of peak values, and identify an ICFO by detecting an index number of a maximal value among the set of peak values.

25 Claims, 12 Drawing Sheets

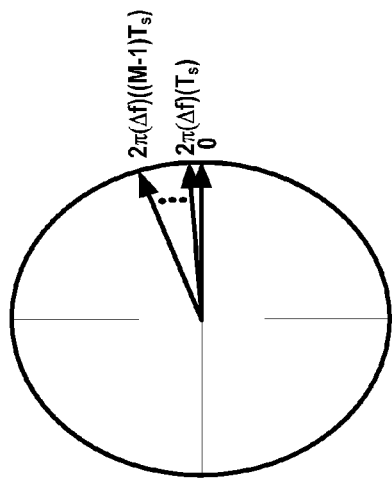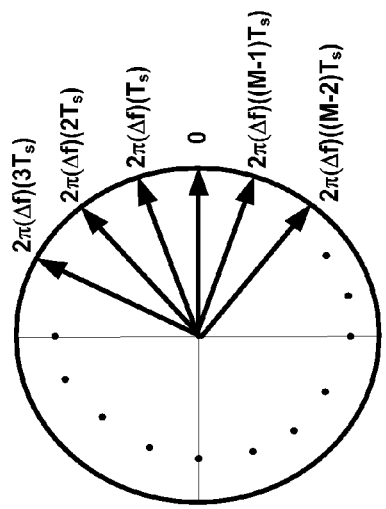
FIG. 2A (PRIOR ART)
FIG. 2B (PRIOR ART)

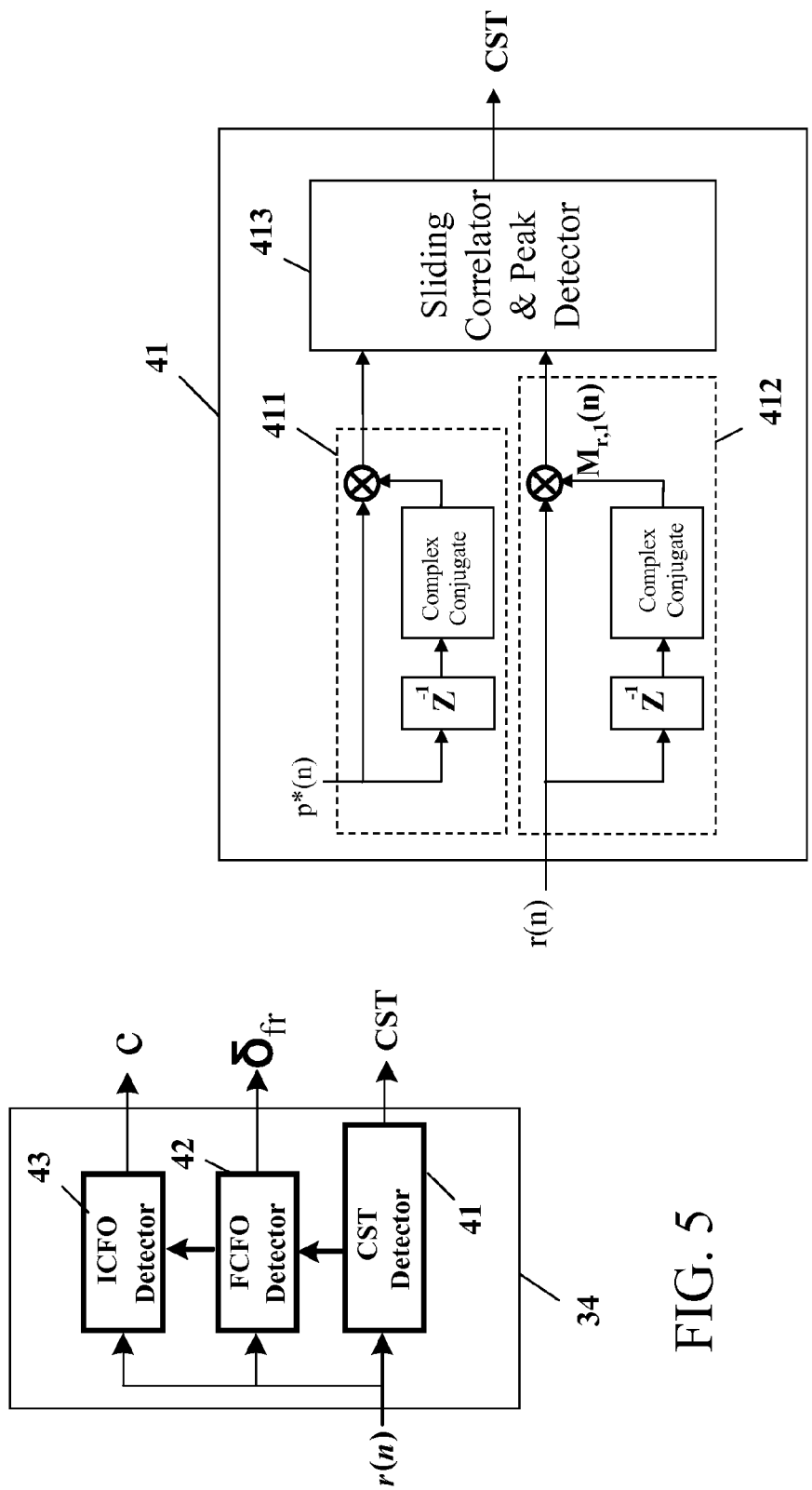

DEVICE FOR AND METHOD OF SIGNAL SYNCHRONIZATION IN A COMMUNICATION SYSTEM

BACKGROUND OF THE INVENTION

The present invention relates to signal synchronization in a communication system and, more particularly, to a device for and a method of signal synchronization in an orthogonal frequency division multiplexing (OFDM) system using pseudo-random noise (PN) guard intervals (GIs).

In a communication system, a base station may process (e.g., encode and symbol-map) data to obtain modulation symbols, and may further process the modulation symbols to generate a modulated signal. The base station then transmits the modulated signal via a communication channel. The communication system may use a transmission scheme whereby data are transmitted in frames, with each frame having a particular time duration. Different types of data, such as traffic/packet data, overhead/control data and pilot, may be sent in different parts of each frame.

A terminal in the system may not know which base stations, if any, near its vicinity are transmitting. Furthermore, the terminal may not know the start of each frame for a given base station, the time at which each frame is transmitted by the base station, or the propagation delay introduced by the communication channel. The terminal may perform signal acquisition to detect for transmission from base stations in the system and to synchronize to the timing and carrier frequency offset of each detected base stations of interest. By performing the signal acquisition process, the terminal can ascertain the timing of each detected base station and can properly perform the complementary demodulation for that base station.

Due to non-ideal channel effects, for example, multi-path reflection and multi-path fading, signals transmitted from base stations to terminals via physical channels (such as air) in a communication system may be distorted. An Orthogonal Frequency Division Multiplexing (OFDM) system that uses multi-carrier modulation technique may effectively solve the problems caused by multi-path reflection effect. In an OFDM system, a simple first-order equalizer at a terminal may equalize constructive and destructive interferences from multi-path reflection effect. FIG. 1A is a schematic diagram of an exemplary symbol format in a conventional OFDM system. Referring to FIG. 1A, a terminal (not shown) may cyclically copy a Guard Interval (GI), which has a length of $T_g$ from a useful OFDM symbol (which has a length of $T_u$ with a number of "N" samples) and then combine the copied GI with the useful OFDM symbol to form a complete symbol "m". Inter-Symbol Interference (ISI) introduced by multi-path at terminals in the OFDM system may be avoided while the maximum delay $\tau_{max}$ of a channel is smaller than $T_g$. The terminals then may remove GI and extract the useful OFDM symbol, perform Fast Fourier Transform (FFT) on the useful OFDM symbol and estimate a channel frequency response in accordance with pilot carriers. A first-order equalizer may subsequently compensate channel effects to estimate the transmitted data.

A Time Domain Synchronization (TDS) OFDM system may perform fast synchronization and reduce system resources (e.g., bandwidth). FIG. 1B is a schematic diagram of an exemplary symbol format in a TDS-OFDM system. Referring to FIG. 1B, in a TDS-OFDM system, a representative symbol "m" may include a GI with a Pseudo-random Noise (PN) sequence, which may exhibit desirable autocorrelation characteristics. A sliding correlator for the received signal and the local PN sequence may be used to rapidly perform symbol timing synchronization and estimate a channel impulse response. An output of the sliding correlator may include the channel impulse response, which indicates the strength and the location for each of the paths in the multi-path channel. The output of the sliding correlator may also include the information on symbol timing. For example, the location of the peak value of the sliding correlator output may represent the coarse symbol timing (CST). Moreover, channel impulse response for the multi-path channel can be estimated in accordance with the output of the sliding correlator. In other words, scattered pilot carriers are no more required in the TDS-OFDM system. Consequently, bandwidth consumption of the total system may be significantly reduced.

However, the desirable autocorrelation characteristics of a PN sequence may be susceptible to carrier frequency offset (CFO), which may attenuate the peak value of an output of a sliding correlator. FIGS. 2A and 2B are schematic diagrams illustrating phase distribution in the autocorrelation of a PN sequence due to a relatively small CFO and a relatively large CFO, respectively. The peak value of a sliding correlator may equal an average sum of a number of "M" linear phases each being proportional to the CFO, as shown in FIGS. 2A and 2B. Referring to FIGS. 2A and 2B, the CFO may affect the magnitude of the autocorrelation of a sliding correlator, which in turn may attenuate an output peak value of the sliding correlator. When the CFO reaches an integer-fold of an integral CFO (ICFO) increment, the peak value of an output of the sliding correlator may drop to zero. The ICFO increment may be defined as $1/(MT_s)$, where "M" is the number of samples in a PN sequence and $T_s$ is the sample length. Consequently, the larger the carrier frequency offset, the more significant attenuation of the output peak value of the sliding correlator.

FIG. 2C is a diagram illustrating peak values of a sliding correlator at various CFOs. The horizontal axis of FIG. 2C represents CFOs in carrier spacing ($f_{sub}$), and the vertical axis represents the magnitude of the autocorrelation outputs of the sliding correlator in the square of millivolt ($(mV)^2$). Referring to FIG. 2C, given a sub-carrier spacing ($f_{sub}$) of two (2) kilohertz (KHz), N=3780 samples and M=255 samples, for initial CFOs ranging from −100 to 100 carrier spacings ($f_{sub}$), i.e., −200 to 200 KHz, the ICFO may be calculated below.

$$\text{ICFO increment} = 1/(MT_s) = (N/M)f_{sub}, \text{ with } f_{sub} = 1/(NT_s)$$

That is, $\text{ICFO increment} = 3780/255(f_{sub}) \approx 14.82(f_{sub})$

As illustrated in FIG. 2C, the peak values of the sliding correlator may equal approximately zero at CFOs which are integer-folds of 14.82 carrier spacings ($f_{sub}$). In an OFDM system, the location of a maximum output peak of the sliding correlator for the received signal and the local PN sequence detected in an OFDM symbol period may correspond to a coarse symbol timing (CST). If the value of the maximum output peak of a sliding correlator is attenuated, information regarding CST may be lost.

Sliding correlation with differential demodulation may be used to prevent the autocorrelation characteristics of a PN sequence from being destroyed by CFOs. FIG. 3 is a block diagram of a conventional communication system 1 using sliding correlation with differential demodulation. Referring to FIG. 3, the communication system 1 may include a differential modulator 12 in a base station and a synchronization unit 14 in a terminal. The synchronization unit 14 may include a differential demodulator 141 and a sliding correlation & peak detection device 142. The synchronization unit 14, which is insensitive to initial CFO, may differentially demodulate a received signal in the differential demodulator 141 and then perform sliding correlation and peak detection in the sliding correlation & peak detection device 142 for CST. The communication system 1 may alleviate the CFO issue, however, the system structure may be complicated because the differential modulator 12 is required for each base station in the system 1. Accordingly, in communication systems that employ other modulation techniques than the differential modulation, a synchronization unit like the unit 14 at a terminal side cannot differentially demodulate a received signal and provide desirable sliding correlation function.

It may therefore desirable to have a device for and a method of signal synchronization in a PN GI-based OFDM system, which may provide sliding correlation that is relatively robust to CFO and may be implemented in a relatively simple structure.

BRIEF SUMMARY OF THE INVENTION

Examples of the present invention may provide a method of signal synchronization in a communication system, the method comprising performing a first sliding correlation for a received signal and a pseudo-random noise (PN) sequence to obtain information on symbol timing, identifying a fractional carrier frequency offset (FCFO) using the information on symbol timing and the cyclic extension property of the PN guard interval (GI), calculating a first product by multiplying the received signal with the FCFO to compensate for the effect of the FCFO, calculating a number of second products by multiplying the first product with each of a set of phases related to integral carrier frequency offsets (ICFOs), performing a number of second sliding correlations each for the PN sequence and one of the number of the second products to identify a number of peak values, and identifying an ICFO by detecting an index number of a maximal value among a number of the peak values.

Some examples of the present invention may also provide a device for signal synchronization in a communication system, the device comprising a first detector configured to perform a first sliding correlation for a received signal and a local pseudo-random noise (PN) sequence to obtain a coarse information on symbol timing (CST), a second detector configured to identify a fractional carrier frequency offset (FCFO) using the information on symbol timing and the cyclic extension property of the PN guard interval (GI), a first multiplier configured to provide a first product by multiplying the received signal with the FCFO to compensate for the effect of the FCFO, and a third detector comprising a set of second multipliers configured to provide a set of second products by multiplying the first product with each of a set of phases related to integral carrier frequency offsets (ICFOs), a set of sliding correlators each being configured to perform a second sliding correlation for the PN sequence and one of the set of the second products, the set of sliding correlators providing a set of peak values, and a peak detector configured to identify an ICFO by detecting an index number of a maximal value among the set of peak values.

Examples of the present invention may further provide a device for signal synchronization in a communication system, the device comprising a first detector configured to perform a first sliding correlation for a received signal and a pseudo-random noise (PN) sequence to obtain a coarse symbol timing (CST), a second detector configured to identify a fractional carrier frequency offset (FCFO) using the CST and the cyclic extension property of the PN guard interval (GI), a first multiplier configured to provide a first product by multiplying the received signal with the FCFO to compensate for the effect of the FCFO, and a third detector comprising a set of second multipliers configured to provide a set of second products by multiplying the first product with one of a set of phases related to integral carrier frequency offsets (ICFOs), a set of sliding correlators configured to perform a set of second sliding correlations for the PN sequence and the set of second products, the set of sliding correlators being capable of providing a set of peak values, and a peak detector configured to receive a set of peak values related to the ICFOs from the set of sliding correlators and identify an ICFO by detecting an index number of a maximal value among the set of peak values.

Other objects, advantages and novel features of the present invention will be drawn from the following detailed embodiments of the present invention with attached drawings, in which:

BRIEF DESCRIPTION OF THE SEVERAL VIEWS OF THE DRAWINGS

The foregoing summary as well as the following detailed description of the preferred embodiments of the present invention will be better understood when read in conjunction with the appended drawings. For the purposes of illustrating the invention, there are shown in the drawings embodiments which are presently preferred. It is understood, however, that the invention is not limited to the precise arrangements and instrumentalities shown. In the drawings:

FIGS. 2A and 2B are schematic diagrams illustrating phase distribution in the autocorrelation of a pseudo-random noise (PN) sequence due to a relatively small carrier frequency offset and a relatively large carrier frequency offset, respectively;

FIG. 5 is a block diagram of a synchronization unit illustrated in FIG. 4 in accordance with an example of the present invention;

FIG. 5A is a block diagram of a coarse symbol timing (CST) detector illustrated in FIG. 5 in accordance with an example of the present invention;

DETAILED DESCRIPTION OF THE INVENTION

Reference will now be made in detail to the present examples of the invention illustrated in the accompanying drawings. Wherever possible, the same reference numbers will be used throughout the drawings to refer to the same or like portions.

Figure 4:
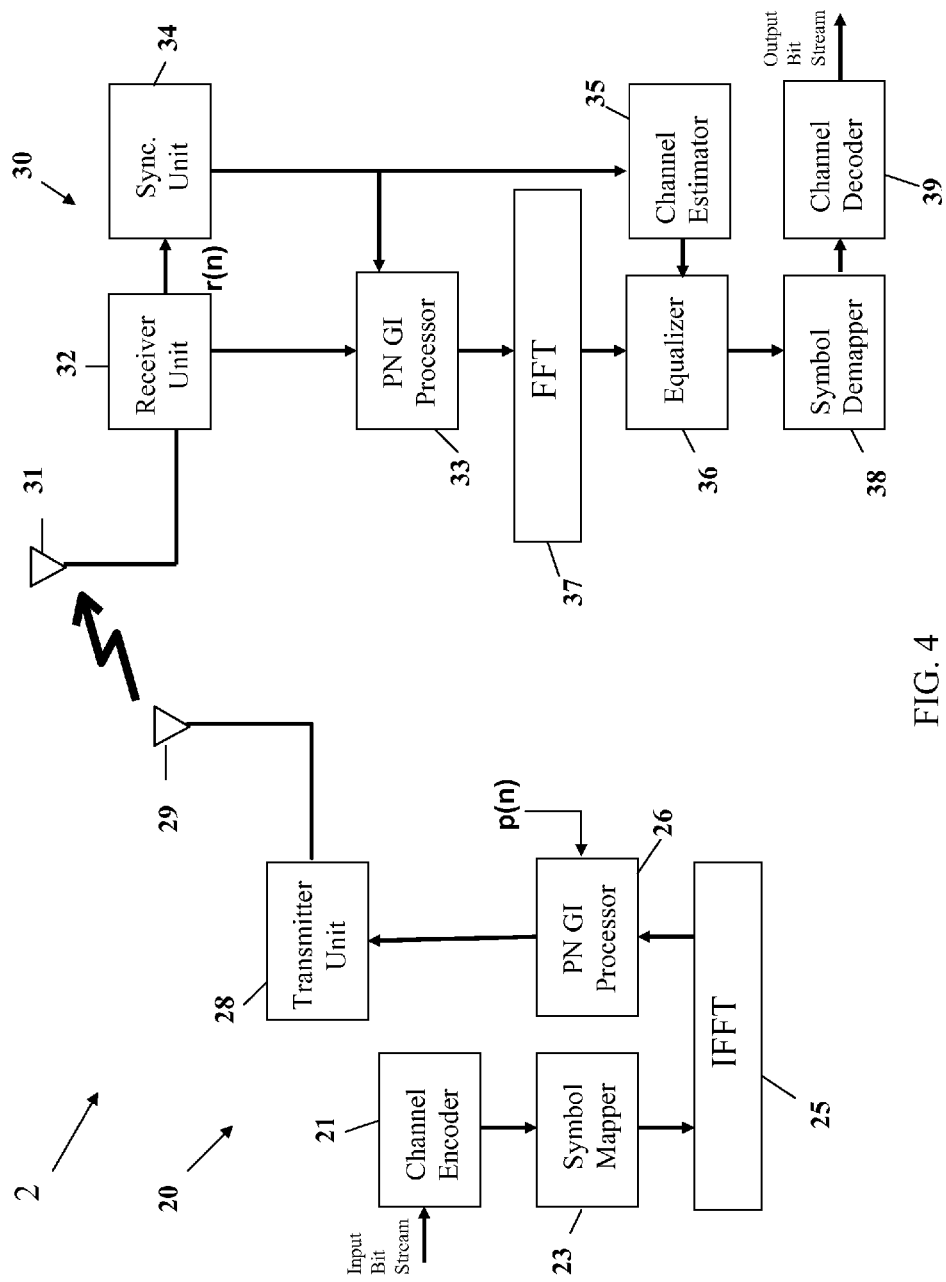
FIG. 4 is a block diagram of a communication system where examples of the present invention may be applicable.

FIG. 4 is a block diagram of a communication system 2 where examples of the present invention may be implemented. Referring to FIG. 4, the communication system 2 may include a base station 20 and a terminal 30, which may be a base station and a mobile station in the communication system 2, respectively. In one example, the communication system 2 may include one of an Asymmetric Digital Subscriber Line (ADSL), Power Line Communication (PLC), Digital Audio Broadcasting (DAB) systems, systems adopting Wireless Local Area Network (WLAN) 802.11a/b/g/n, Digital TV System (DVB-T and DVB-H) standards and the future 4G personal communication system. In another example, the communication system 2 may utilize Orthogonal Frequency Division Multiplexing (OFDM) techniques.

Figure 1A:
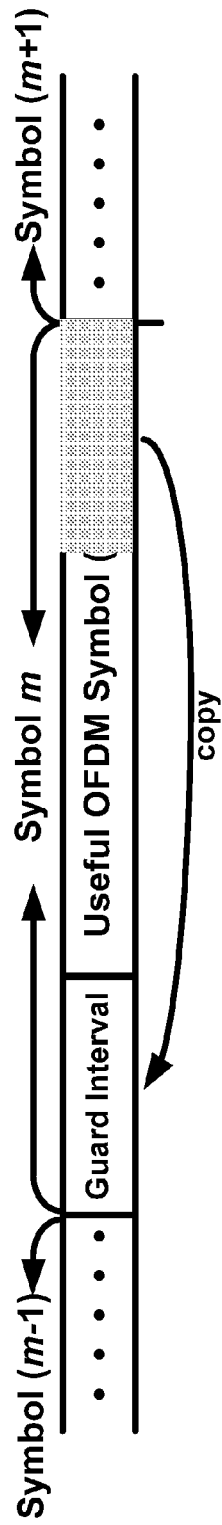
FIG. 1A is a schematic diagram of an exemplary symbol format in a conventional orthogonal frequency division multiplexing (OFDM) system.
Figure 1B:
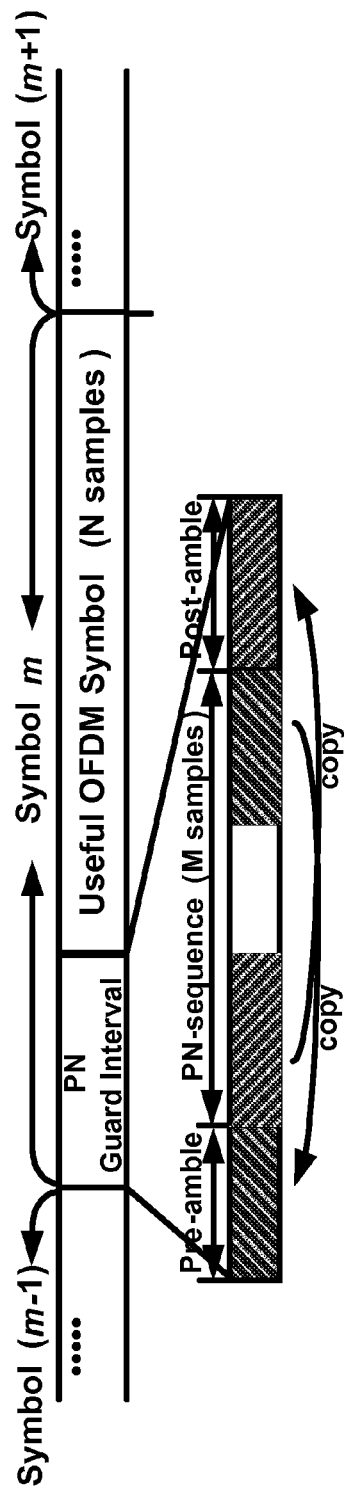
FIG. 1B is a schematic diagram of an exemplary symbol format in a time domain synchronization (TDS) OFDM system.
Figure 2C:
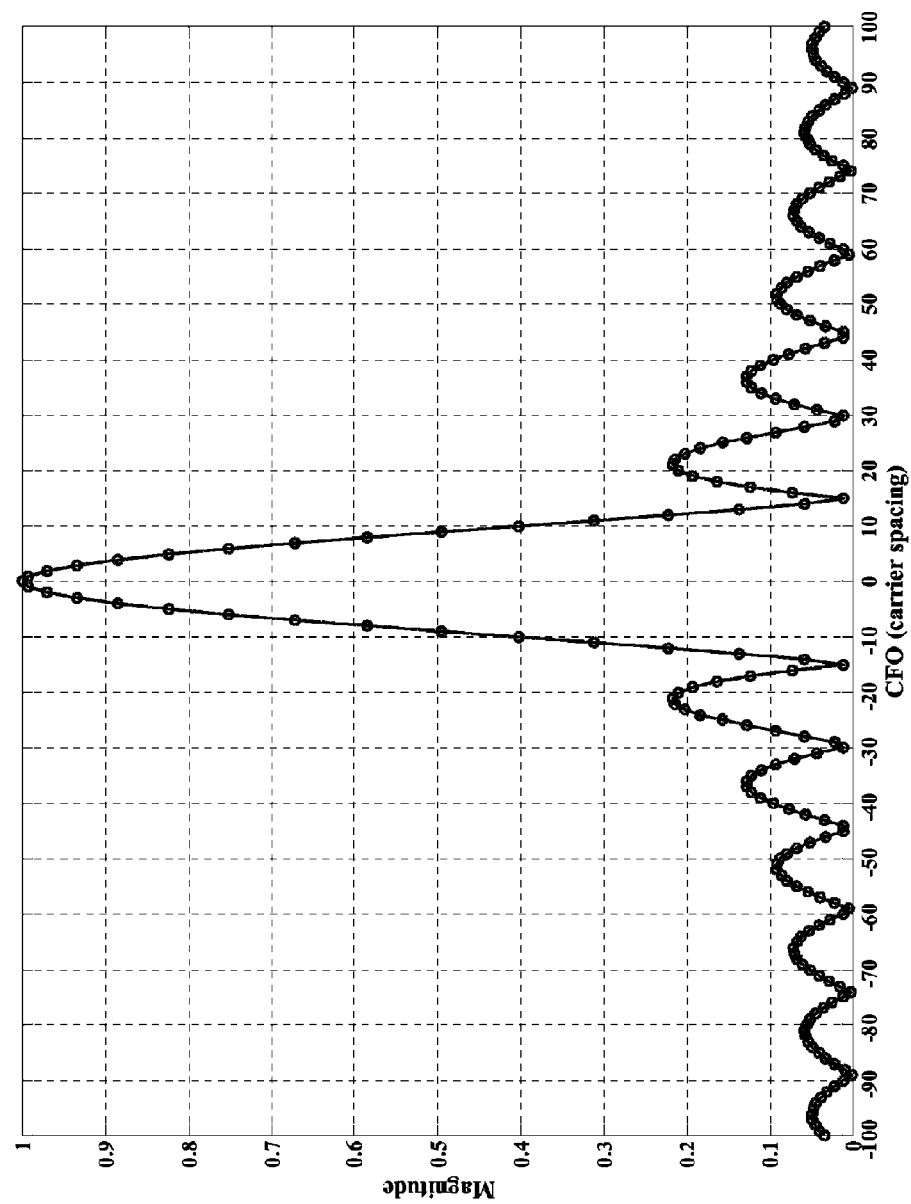
FIG. 2C is a diagram illustrating peak values of a sliding correlator at various carrier frequency offsets (CFOs)

An OFDM symbol to be transmitted in the communication system 2 may include a PN GI and a useful OFDM symbol. The PN GI may include a PN sequence having a length of "M" samples and the pre-amble/post-amble (the cyclically prefixed version and the cyclically postfixed version of the PN sequence), as shown in FIG. 1B. The useful OFDM symbol may have a length of "N" samples. Each of the "M" and "N" samples may have a length of $T_s$ (second). Accordingly, a useful symbol duration $T_u$ may equal $N*T_s$ (second), and a PN sequence duration may equal $M*T_s$ (second). Furthermore, carrier spacing between two successive carriers may be represented by $f_{sub}=1/T_u=1/(N*T_s)$ (Hertz). Moreover, carrier frequency offset (CFO) may be expressed below.

CFO=Integral CFO (ICFO)+Fractional CFO (FCFO)

where ICFO represents an integer portion of the CFO and FCFO represents a fractional portion of the CFO. CFO, ICFO and FCFO may also be expressed as follows.

CFO=$\Delta f=\epsilon *f_{sub}$;

ICFO=$c*\delta_{int}*f_{sub}$;

FCFO=$\delta_{fr}*f_{sub}$; and $\epsilon=c*\delta_{int}+\delta_{fr}$ and $\delta_{int}=N/M$ where "c" is an integer, $\delta_{int}$, $\delta_{fr}$ and $\epsilon$ are numeric values and $\delta_{int}*f_{sub}$ may represent an ICFO increment.

In the communication system 2, the base station 20 may include a channel encoder 21, a symbol mapper 23, an Inverse Fast Fourier Transformer (IFFT) 25, a PN GI processor 26 and a transmitter unit 28. The channel encoder 21 may be configured to receive data, such as bit streams, and encode the received data. Symbol mapping may then be performed for the encoded signals at the symbol mapper 23. The IFFT 25 transforms data symbols from frequency domain to time domain. The PN GI processor 26 processes the transformed data symbols and provides to the transmitter unit 28 a stream of samples, each of which may have a Pseudo-random Noise Guard Interval (PN GI). The transmitter unit 28 may convert the sample stream into analog signals and may further process (e.g., amplify, filter, and frequency upconvert) the analog signals to generate a modulated signal. The base station 20 then transmits the modulated signal from an antenna 29 to the terminal 30 in the communication system 2.

At the terminal 30, the modulated signal from the base station 20 may be received by an antenna 31 and provided to a receiver unit 32. The receiver unit 32 may process (e.g., filter, amplify, frequency downconvert and digitize) the received signal to generate a stream of received samples. A synchronization unit 34 obtains the received samples from the receiver unit 32, performs acquisition and determines the timing and carrier frequency offset of each detected base station. The synchronization unit 34 provides timing and carrier frequency offset information to a PN GI processor 33 and a channel estimator 35, respectively. The channel estimator 35 performs a channel estimate for a channel impulse response and transforms the channel impulse response to a channel frequency response through FFT operation. Furthermore, the channel estimator 35 provides the estimated channel frequency response to an equalizer 36. The PN GI processor 33 removes PN GI from the received samples by using the timing information and then provides the received samples to the FFT 37. The equalizer 36 may equalize the received samples from the FFT 37 in accordance with the estimated channel frequency response provided by the channel estimator 35. The equalized samples are then sequentially processed by a symbol demapper 38 and a channel decoder 39 to recover the data sent by the base station 20. In general, the processing by the PN GI processor 33, FFT 37, symbol demapper 38 and channel decoder 39 may be complementary to the processing by the PN GI processor 26, IFFT 25, symbol mapper 23 and channel encoder 21 at base station 20. In one example, the PN GI processor 33, synchronization unit 34, channel estimator 35, equalizer 36, FFT 37, symbol demapper 38 and channel decoder 39 may be integrated in a single chip, such as a microprocessor (not shown).

FIG. 5 is a block diagram of the synchronization unit 34 illustrated in FIG. 4 in accordance with an example of the present invention. Referring to FIG. 5, the synchronization unit 34 may include a coarse symbol timing (CST) detector 41, a fractional carrier frequency offset (FCFO) detector 42 and an integral carrier frequency offset (ICFO) detector 43. The CST detector 41, FCFO detector 42 and ICFO detector 43 may be configured to identify the CST information and the values of $\delta_{fr}$ and c, respectively. When the CST information, $\delta_{fr}$ and c are available, the timing information and the carrier frequency offset "$\Delta f$" ($\Delta f=\epsilon *f_{sub}$, where $\epsilon=c*N/M+\delta_{fr}$) may be identified.

FIG. 5A is a block diagram of the CST detector 41 illustrated in FIG. 5 in accordance with an example of the present invention. Referring to FIG. 5A, the CST detector 41 may include a first delay product circuit 411, a second delay product circuit 412 and a sliding correlator & peak detector 413. Hence, this CST detector 41 may function to serve as a differential sliding correlator. The first delay product circuit 411 may be configured to provide a first delay product of a signal $p*(n)$, which is a complex conjugate of a local PN sequence $p(n)$, n being an integer ranging from 0 to M−1. The second delay product circuit 412 may be configured to provide a second delay product $M_{r,1}(n)$ of a received signal $r(n)$ from the output of the receiver unit 32 illustrated in FIG. 4. The second delay product $M_{r,1}(n)$ may be expressed in an equation below.

$$M_{r,1}(n)=r(n)r*(n-1)=x(n)x*(n-1)\exp(j2\pi\epsilon/N)$$

Figure 3:
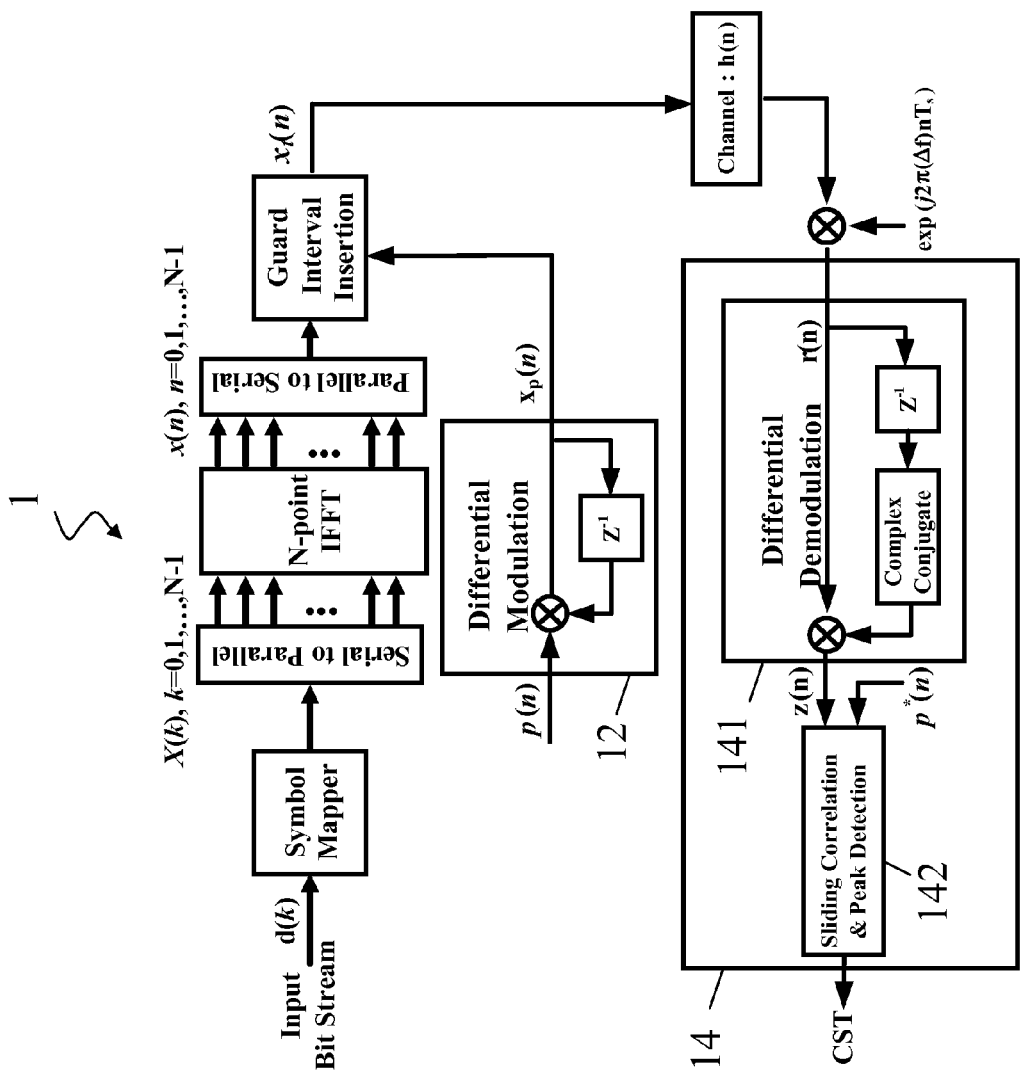
FIG. 3 is a block diagram of a conventional communication system using sliding correlation with differential demodulation.

The second delay product circuit 412 may cancel the time-dependent linear phase shift effect caused by the CFO, hence the peak of an output of a subsequent sliding correlator may not be attenuated by the CFO. The sliding correlator & peak detector 413 in one example may include a sliding correlator, which may perform sliding correlation for the outputs of the first and second delay products and a peak detector, which may detect the location of a peak from the output of the sliding correlator for each OFDM symbol including a PN GI and a useful OFDM symbol. An output of the sliding correlator may include a channel impulse response, which indicates the strength and the location for each of the paths in the multi-path channel. The output of the sliding correlator may also include the information on symbol timing. For example, the location of the peak value of the sliding correlator output may represent the coarse symbol timing (CST). The CST may help the FCFO detector 42 to calculate a fractional CFO. Accordingly, in one example consistent with the present invention, the CST may be identified prior to the FCFO. Furthermore, the use of the differential sliding correlator at the CST detector 41 may facilitate the transmitter side of the communication system 2 to use other modulation technique than the differential modulation technique. Compared to the conventional technique described and illustrated with reference to FIG. 3, the present invention may be implemented in a relatively simple structure.

Figure 5B:
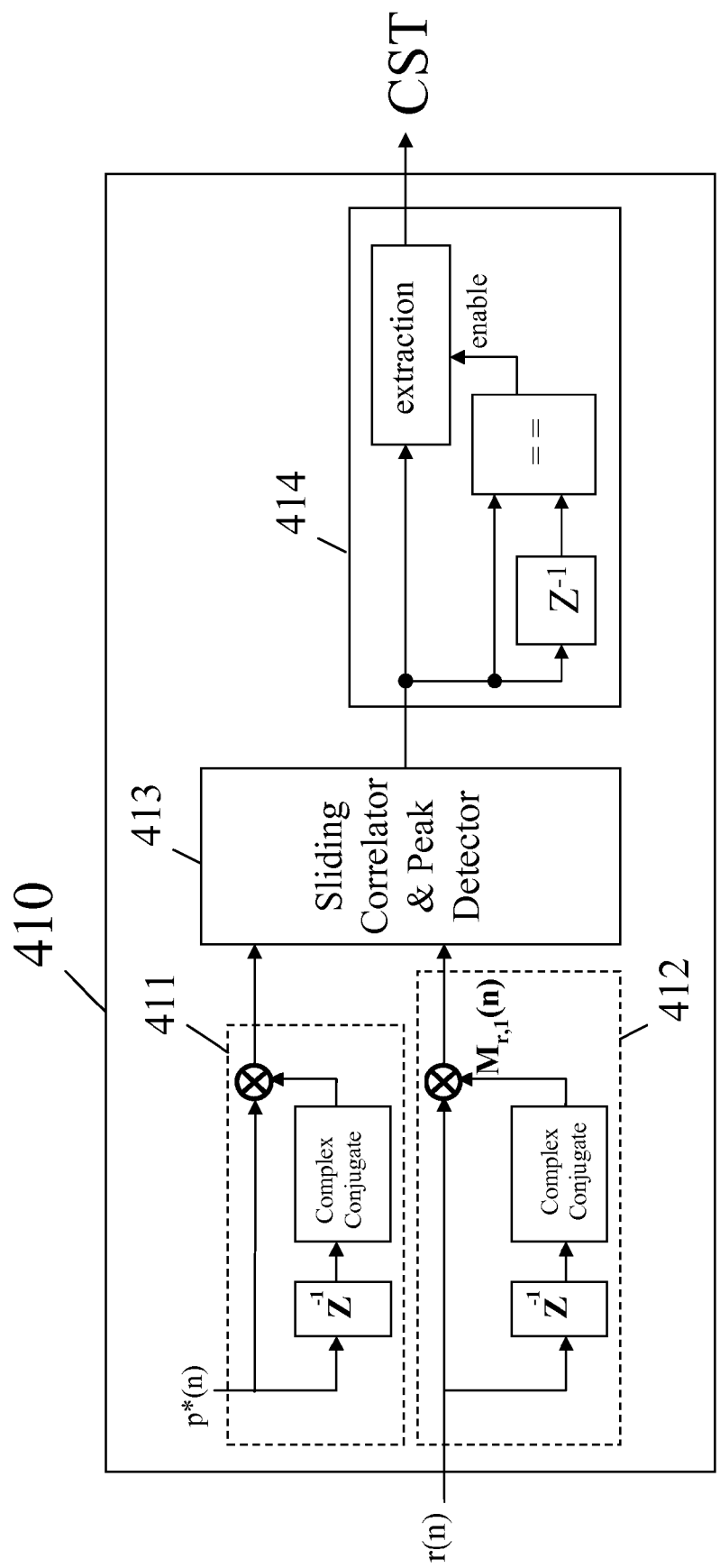
FIG. 5B is a block diagram of a CST detector in accordance with another example of the present invention.

FIG. 5B is a block diagram of a CST detector 410 in accordance with another example of the present invention. Referring to FIG. 5B, the CST detector 410 may be similar to the CST detector 41 described and illustrated with reference to FIG. 5A except that, for example, a protection circuit 414 may be coupled to the sliding correlator & peak detector 413. The protection circuit 414 may be configured to detect whether the length between the locations of two successive peaks from the output of the sliding correlator & peak detector 413 substantially equals the length of an OFDM symbol. If not, the CST may be discarded. If confirmative, the CST may be provided to the FCFO detector 42.

Figure 5C:
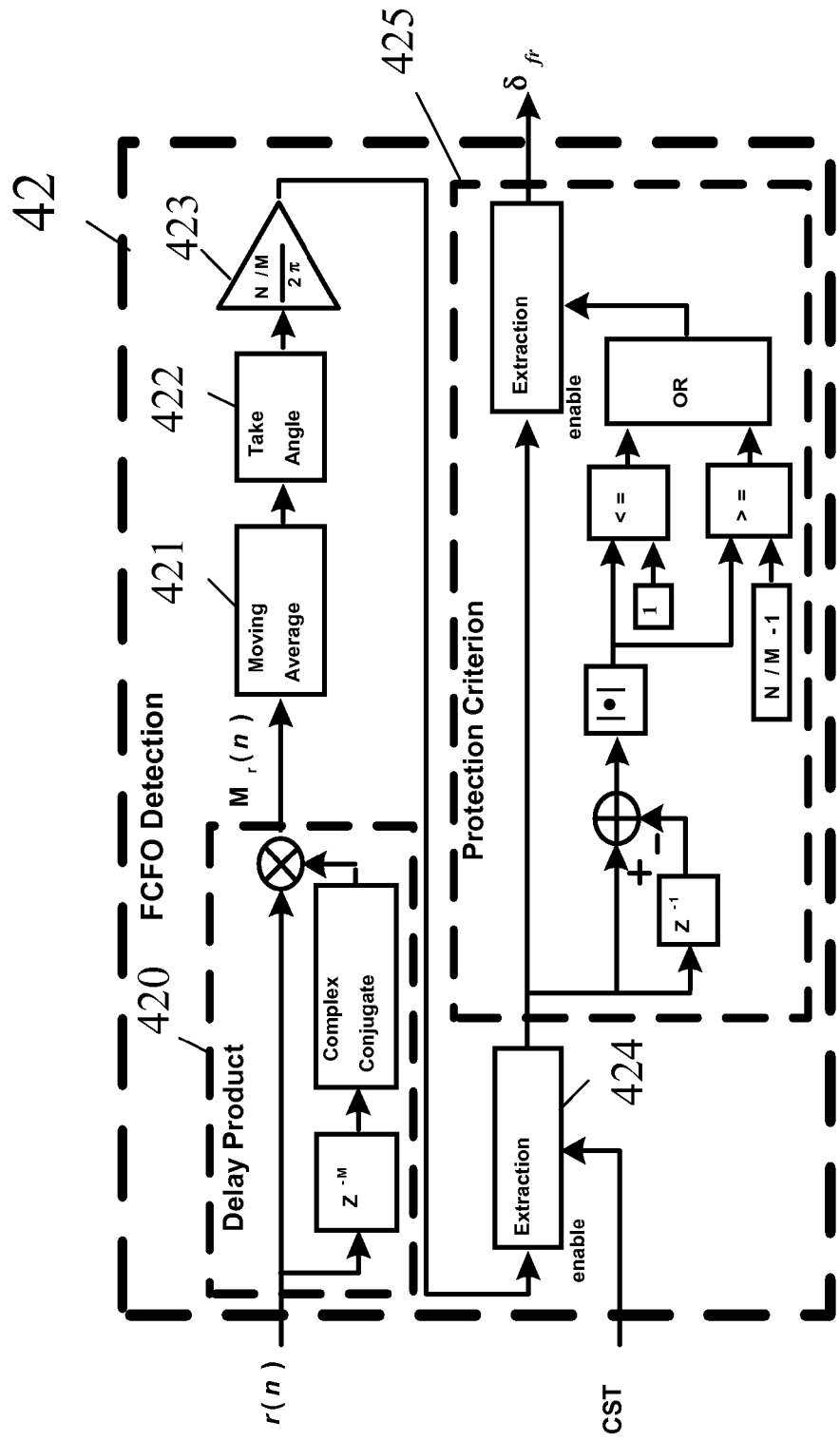
FIG. 5C is a block diagram of a fractional carrier frequency offset (FCFO) detector illustrated in FIG. 5 in accordance with an example of the present invention.

FIG. 5C is a block diagram of the FCFO detector 42 illustrated in FIG. 5 in accordance with an example of the present invention. Referring to FIG. 5C, the FCFO detector 42 may receive the received signal r(n) from the output of the receiver unit 32 and the CST from the CST detector 41, and identify a fractional CFO "$\delta_{fr}$" based on the CST and the cyclic extension property of the PN guard interval (GI). The output $M_r(n)$ of the third delay product 420 illustrated in FIG. 5C may be expressed as follows.

$$M_r(n)=r(n)r^*(n-M)=x(n)x^*(n-M)\exp(j2\pi M\epsilon/N)$$

As a result, $M_r(n)$ based on the cyclic extension property of the PN guard interval (GI) may include a section where the phase is constant and dependent on the CFO ($\epsilon$). The location of such a section may be related to the synchronization information, i.e., the CST. Because the phase ranges between $-\pi$ and $\pi$, the detected CFO may be defined as the fractional CFO. The fractional CFO "$\delta_{fr}$" may be given below.

$\delta_{fr}=(1/2\pi)*(N/M)*\arg\{M_r(n)\}$, for "n" belonging to a region related to the CST.

The FCFO detector 42 may include the third delay product circuit 420 capable of providing the third delay product $M_r(n)$, a moving average device 421 capable of providing precise information on the constant phase, and a device 422 configured to detect an angle in the $M_r(n)$, i.e., the "arg $\{M_r(n)\}$" of the fractional CFO "$\delta_{fr}$". The angle "arg $\{M_r(n)\}$" may then be multiplied by "$(1/2\pi)$ (N/M)" in a multiplier 423, resulting in "$\delta_{fr}$"=$(1/2\pi)$ (N/M) arg $\{M_r(n)\}$.

The fractional CFO "$\delta_{fr}$" may be extracted by a extractor 424 in response to the CST from the CST detector 41. The FCFO detector 42 may further include a protection circuit 425 to check whether a fractional CFO value is qualified for output. If not, the fractional CFO "$\delta_{fr}$" may be discarded. If confirmative, the fractional CFO "$\delta_{fr}$" may be provided to the ICFO detector 43. In one example according to the present invention, the values of "N" and "M" equal 3780 and 255, the fractional CFO "$\delta_{fr}$" may range from approximately −7.41 to 7.41.

Figure 5D:
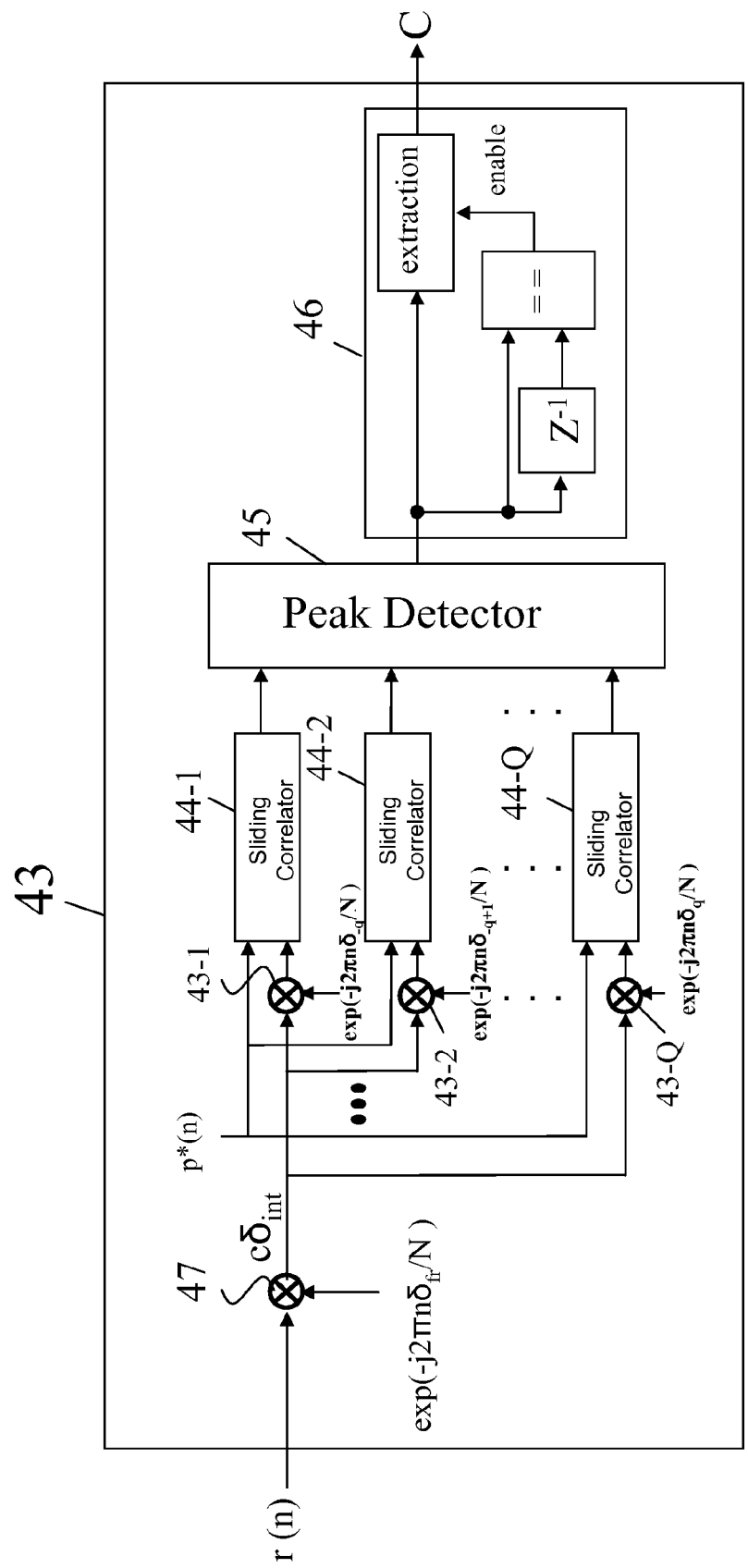
FIG. 5D is a block diagram of an integral carrier frequency offset (ICFO) detector illustrated in FIG. 5 in accordance with an example of the present invention.

FIG. 5D is a block diagram of the ICFO detector 43 illustrated in FIG. 5 in accordance with an example of the present invention. Referring to FIG. 5D, the ICFO detector 43 may include a first multiplier 47, a number of second multipliers 43-1 to 43-Q, a number of sliding correlators 44-1 to 44-Q coupled in parallel with one another and a peak detector 45, wherein Q is an integer. The received signal r(n) from the output of the receiver unit 32 may be multiplied at the first multiplier 47 with a linear phase from the output of the FCFO detector 42, represented by $\exp(-j*2\pi*n*\delta_{fr}/N)$, to obtain a first product. As a result, a fractional CFO "$\delta_{fr}*f_{sub}$" in the received signal r(n) may be cancelled and an integral CFO, i.e., $c*\delta_{int}*f_{sub}$, may remain. The second multipliers 43-1 to 43-Q may each generate a second product of the first product and one of a set of phases, which are related to ICFOs and represented by $\exp(-j*2\pi*n*\delta_i/N)$, wherein $\delta_i=(N/M)*i$, i being an integer ranging from −q to q, q being an integer and Q=2*q+1. The sliding correlators 44-1 to 44-Q may each perform sliding correlation for the signal $p^*(n)$ and the output of a corresponding second product from one of the corresponding second multipliers 43-1 to 43-Q. The peak detector 45 may sort the outputs from the sliding correlators 44-1 to 44-Q for a maximum peak value and output the index number of the corresponding sliding correlator. The value "c" of an integral ICFO may be obtained from the detected index number. Furthermore, the ICFO detector 43 may include a protection circuit 46 to check whether the integral CFO value "c" is qualified for output.

The value of "q" may depend on the values of, for example, N, M, $f_{sub}$ and the initial CFO, which in turn may depend on hardware capacity or complexity of the communication system 2. Given $\delta_{int}=N/M=3780/255=14.82$, $f_{sub}=2$ KHz, and initial CFO ranging from −200 to 200 KHz, the value of q may be set to approximately 7. Accordingly, the value of Q is 15. In the present example, assuming that the received signal r(n) is associated with a CFO of, for example, $-5.3*\delta_{int}*f_{sub}$, which may be unknown to the synchronization unit 34 illustrated in FIG. 4, the fractional CFO, i.e., $\delta_{fr}*f_{sub}=-0.3*\delta_{int}*f_{sub}$, may be detected by the FCFO detector 42 and cancelled at the first multiplier 47, resulting in an integral CFO, i.e., $-5*\delta_{int}*f_{sub}$. The integral CFO may be multiplied with a first phase $\exp(-j*2\pi*n*\delta_{-7}/N)$ at a first one 43-1 of the second multipliers 43-1 to 43-15, resulting in a first output phase, $\exp(-j*2\pi*n*(5-7)*\delta_{int}/N)$. The "nonzero" first output phase may destroy the characteristic of the PN sequence. Consequently, a first sliding correlator 44-1 of the sliding correlators 44-1 to 44-15 may identify a "near-zero" peak value in response to the first output phase.

Simultaneously, the integral CFO may be multiplied with a second phase $\exp(-j*2\pi*n*\delta_{-6}/N)$ at a second one 43-2 of the second multipliers 43-1 to 43-15, resulting in a second output phase, $\exp(-j*2\pi*n*(5-6)*\delta_{int}/N)$. The "nonzero" second output phase may destroy the characteristic of the PN sequence. Consequently, a second sliding correlator 44-2 of the sliding correlators 44-1 to 44-15 may identify a "near-zero" peak value in response to the second output phase.

Simultaneously, the integral CFO may be multiplied with a third phase $\exp(-j*2\pi*n*\delta_{-5}/N)$ at a third one 43-3 of the second multipliers 43-1 to 43-15, resulting in a third output phase, $\exp(-j*2\pi*n*(5-5)*\delta_{int}/N)$. The "zero" third output phase may not destroy the characteristic of the PN sequence. Consequently, a third sliding correlator 44-3 of the sliding correlators 44-1 to 44-15 may identify a "near-one" peak value in response to the third output phase. Each of the remaining sliding correlators 44-4 to 44-15 may operate in a similar fashion to that of the sliding correlator 44-1 or 44-2 and identify a near-zero peak value. The index number "−5" of the corresponding sliding correlator 44-3 with the near-one peak value may then be detected by the peak detector 45. The value c of an integral ICFO may be obtained from the detected index number "−5". As a result, the value of initial CFO ($=c*\delta_{int}*f_{sub}+\delta_{fr}*f_{sub}=c*(N/M)*f_{sub}+\delta_{fr}*f_{sub}$) may be identified when the values of the fractional CFO "$\delta_{fr}$" and the integral CFO "c" are identified.

Figure 5E:
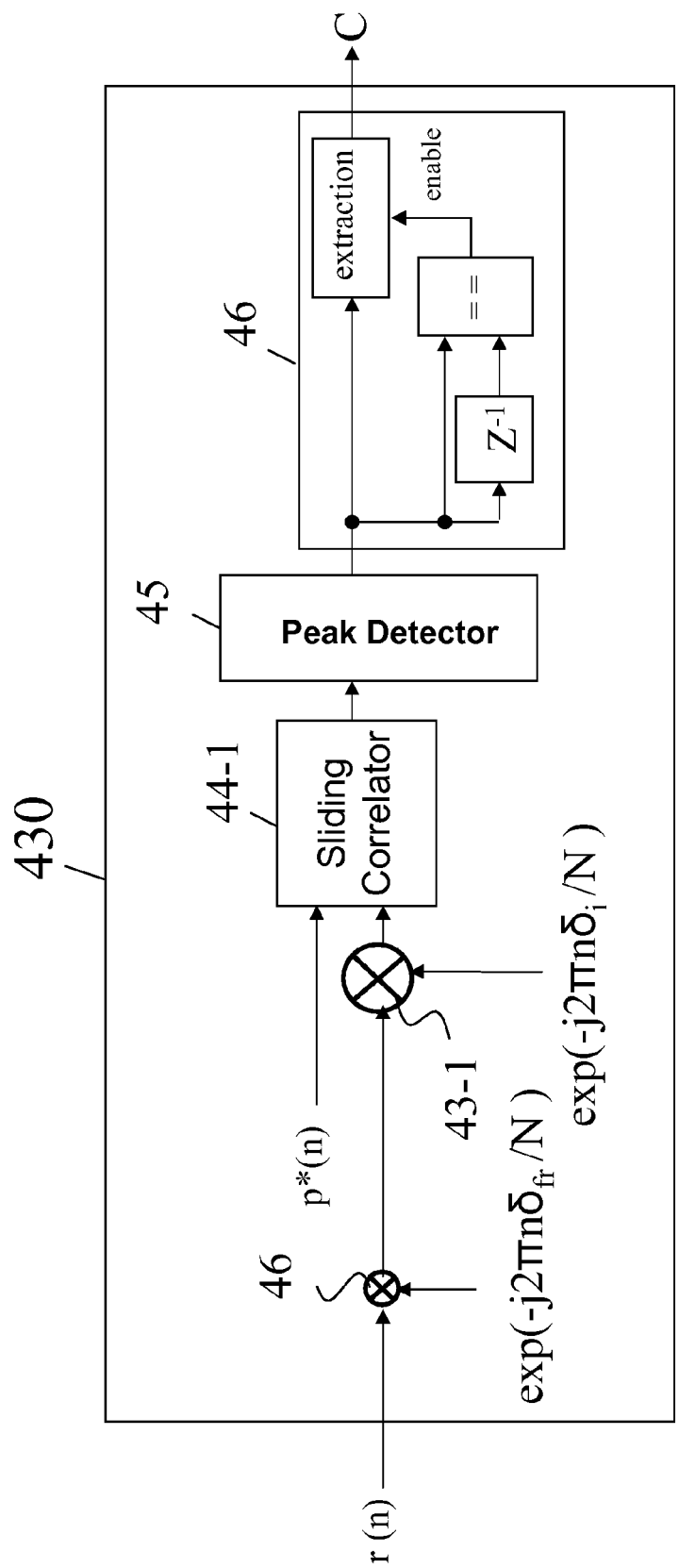
FIG. 5E is a block diagram of an ICFO detector in accordance with another example of the present invention.

FIG. 5E is a block diagram of an ICFO detector 430 in accordance with another example of the present invention. Referring to FIG. 5E, the ICFO detector 430 may be similar to the ICFO detector 43 described and illustrated with reference to FIG. 5D except that, for example, only one of the second multipliers 43-1 to 43-Q and only one of the sliding correlators 44-1 to 44-Q are employed. In operation, the set of phases represented by $\exp(-j*2\pi*n*\delta_i/N)$, where $-q \leq i \leq q$ and q may depend on the values of N, M, $f_{sub}$ and the initial CFO, may be provided in a sequential order to the second multiplier 43-1 of the ICFO detector 430, and the sliding correlator 44-1 and the peak detector 45 may process the set of phases in such a sequential order and output a peak value for one OFDM symbol period. After Q (Q=2*q+1) OFDM symbol periods, the index number of period with the maximum peak value may be detected by the peak detector 45 and the corresponding value "c" of an integral ICFO may be obtained.

Figure 6A:
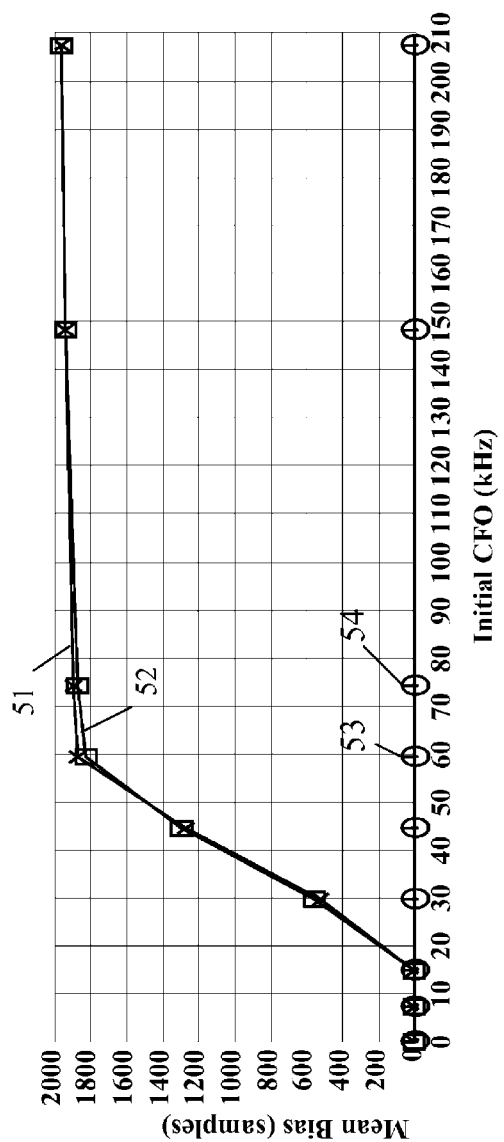
FIGS. 6A and 6B are plots respectively showing simulation results of mean bias and standard deviation of symbol timing detection at various speeds of a mobile terminal in accordance with examples of a conventional method and the present invention over a time-varying 6-taps typical urban (TU6) channel.
Figure 6B:
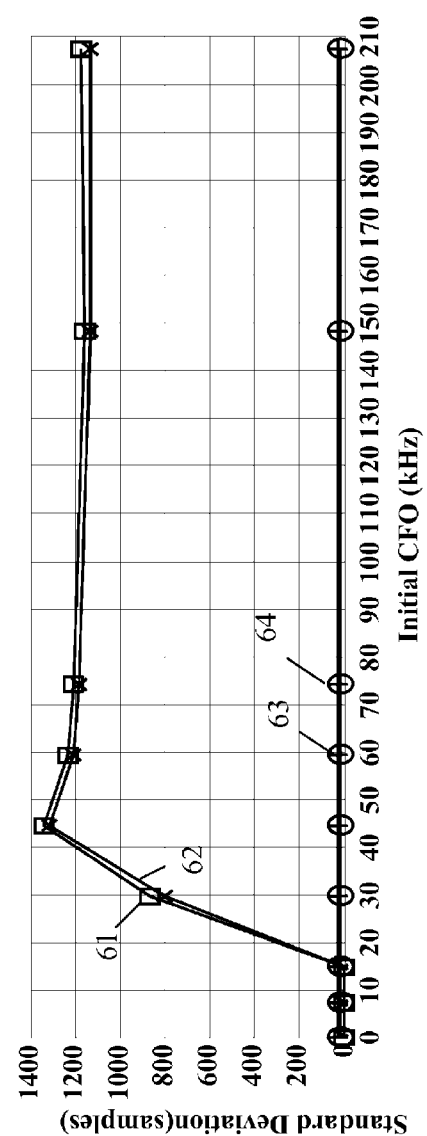

FIGS. 6A and 6B are plots respectively showing simulation results of mean bias and standard deviation of symbol timing detection at various speeds of a mobile terminal in according with examples of a conventional method and the present invention over a time-varying 6-taps typical urban (TU6) channel. Referring to FIG. 6A, a first curve 51 may represent mean bias of the symbol timing detection for a conventional terminal on a vehicle at a speed of approximately 180 km/hr. A second curve 52 may represent mean bias of the symbol timing detection for the conventional terminal on a vehicle at a speed of approximately 60 km/hr. A third curve 53 may represent mean bias of the symbol timing detection for a terminal, which may be disposed on a vehicle at a speed of approximately 180 km/hr, according to an example of the present invention. A fourth curve 54 may represent mean bias of the symbol timing detection for a terminal, which may be disposed on a vehicle at a speed of approximately 60 km/hr, according to another example of the present invention. From the curves 51 and 52, it may be seen that mean bias of the symbol timing detection significantly increases as the initial CFO exceeds approximately 15 KHz (about $0.5*\delta_{int}*f_{sub}$). The mean bias of the symbol timing detection may approach approximately 2000 samples as the initial CFO increases from approximately 60 KHz towards 210 KHz. Nevertheless, the curves 53 and 54 show that substantially no significant mean bias for the symbol timing detection may appear over the CFO effect, which may mean that CFO effect due to oscillator mismatch between base stations and terminals may have been significantly alleviated in the terminals in accordance with the present invention.

Referring to FIG. 6B, a first curve 61 may represent the standard deviation of the symbol timing detection for a conventional terminal on a vehicle at a speed of approximately 180 km/hr. A second curve 62 may represent the standard deviation of the symbol timing detection for the conventional terminal on a vehicle at a speed of approximately 60 km/hr. A third curve 63 may represent the standard deviation of the symbol timing detection for a terminal, which may be disposed on a vehicle at a speed of approximately 180 km/hr, according to an example of the present invention. A fourth curve 64 may represent the standard deviation of the symbol timing detection for a terminal, which may be disposed on a vehicle at a speed of approximately 60 km/hr, according to another example of the present invention. From the curves 61 and 62, it may be seen that the standard deviation of the symbol timing detection significantly increases as the initial CFO exceeds approximately 15 KHz (about $0.5*\delta_{int}*f_{sub}$). The standard deviation of the symbol timing detection may approach approximately 1300 samples as the initial CFO increases from approximately 45 KHz to 210 KHz. Nevertheless, the curves 63 and 64 show that substantially no significant standard deviation for the symbol timing detection may appear because CFO effect may have been significantly alleviated in the terminals in accordance with the present invention.

Figure 7:
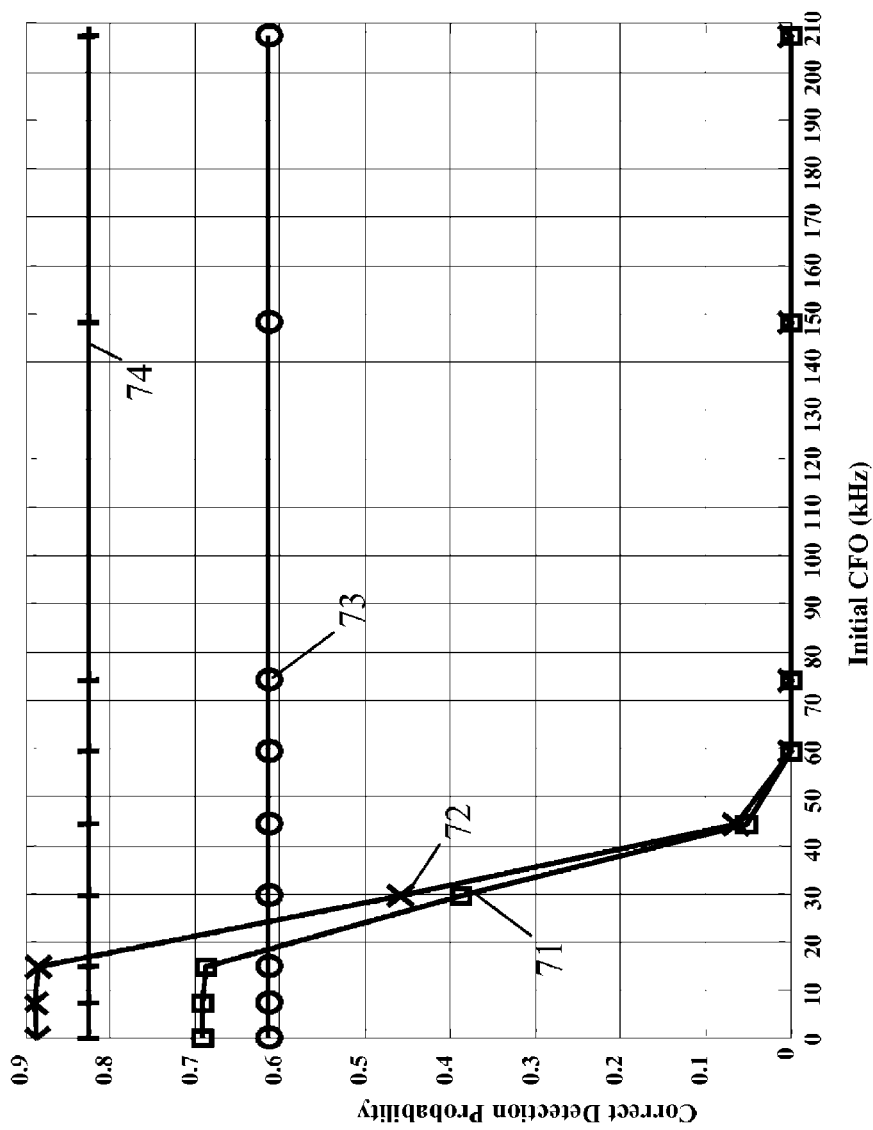
FIG. 7 is a plot showing simulation results of frame timing detection at various speeds of a mobile terminal in accordance with examples of a conventional method and the present invention over a time-varying TU6 channel.

FIG. 7 is a plot showing simulation results of frame timing detection at various speeds of a mobile terminal in accordance with examples of a conventional method and the present invention over a time-varying 6-taps typical urban (TU6) channel. To evaluate the performance of frame timing detection, a correct detection probability may be defined as given below.

Correct Detection Probability=
$N_{FT,CORRECT}/N_{FT,TOTAL}$ where $N_{FT,CORRECT}$ is the number of correct frame timing detection and $N_{FT,TOTAL}$ is the number of total frame timing estimation. The environment where the frame timing detection is performed may be similar to the communication system 2 where CST estimation is performed, as shown in FIG. 4. The frame timing detection is correct when the symbol timing detection is correct for successive three times. Referring to FIG. 7, a first curve 71 may represent correct detection probability of a conventional terminal on a vehicle at a speed of approximately 180 km/hr. A second curve 72 may represent correct detection probability of a conventional terminal on a vehicle at a speed of approximately 60 km/hr. A third curve 73 may represent correct detection probability of a terminal, which may be disposed on a vehicle at a speed of approximately 180 km/hr, according to an example of the present invention. A fourth curve 74 may represent correct detection probability of a terminal, which may be disposed on a vehicle at a speed of approximately 60 km/hr, according to another example of the present invention. With respect to the conventional technique, as represented by the curves 71 and 72, correct detection probability significantly decrease as the initial CFO exceeds approximately 15 KHz (about $0.5*\delta_{int}*f_{sub}$). Nonetheless, as to the present invention, the curve 74 shows that the correct detection probability may be maintained at approximately 0.83. Moreover, the curve 73 shows that the correct detection probability may be kept at approximately 0.62 because the influence of CFO may be alleviated by the present invention. In other words, the correct frame timing may be obtained at about the duration of four OFDM symbols for the present invention in spite of the existence of a relatively large initial CFO.

In describing representative examples of the present invention, the specification may have presented the method and/or process of operating the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

I claim:

1. A method of signal synchronization in a communication system, the method comprising:
    performing a first sliding correlation for a received signal and a pseudo-random noise (PN) sequence to obtain information on symbol timing;
    identifying a fractional carrier frequency offset (FCFO) using the information on symbol timing;
    calculating a first product by multiplying the received signal with the FCFO;
    calculating a number of second products by multiplying the first product with each of a set of phases related to integral carrier frequency offsets (ICFOs);
    performing a number of second sliding correlations each for the PN sequence and one of the number of the second products to identify a number of peak values; and
    identifying an ICFO by detecting an index number of a maximal value among the number of peak values.

2. The method of claim 1, wherein the first sliding correlation includes a differential sliding correlation.

3. The method of claim 1, wherein the information on symbol timing includes a coarse symbol timing (CST).

4. The method of claim 1, wherein the number of second sliding correlations are performed simultaneously.

5. The method of claim 1, wherein the number of second sliding correlations are performed sequentially.

6. The method of claim 1 further comprising identifying the carrier frequency offset (CFO) of the received signal as $$CFO = (c^* \delta_{int} + \delta_{fr})^* f_{sub}$$

wherein "c" is an integer, $\delta_{int}$ equals N/M, $\delta_{fr}$ is a real number ranging from $-0.5^*\delta_{int}$ to $0.5^*\delta_{int}$, $c^*\delta_{int}^*f_{sub}$ is defined as the ICFO, $\delta_{fr}^*f_{sub}$ is defined as the FCFO and $f_{sub}$ is a carrier spacing, "N" and "M" being the number of samples in a useful OFDM symbol and the PN sequence, respectively.

7. The method of claim 1 further comprising providing the set of phases in the form of $\exp(-j^*2\pi^*n^*\delta_i/N)$, wherein $\delta_i$ equals $(N/M)^*i$, i being an integer ranging from $-q$ to $q$, and q being an integer.

8. A device for signal synchronization in a communication system, the device comprising:
    a first detector configured to perform a first sliding correlation for a received signal and a pseudo-random noise (PN) sequence to obtain information on symbol timing;
    a second detector configured to identify a fractional carrier frequency offset (FCFO) using the information on symbol timing;
    a first multiplier configured to provide a first product by multiplying the received signal with the FCFO; and
    a third detector comprising:
        a set of second multipliers configured to provide a set of second products by multiplying the first product with each of a set of phases related to integral carrier frequency offsets (ICFOs);
        a set of sliding correlators each being configured to perform a second correlation for the PN sequence and one of the set of the second products, the set of sliding correlators providing a set of peak values; and
        a peak detector configured to identify an ICFO by detecting an index number of a maximal value among the set of peak values.

9. The device of claim 8, wherein the first detector includes a first delay product circuit configured to provide a first delay product by multiplying the PN sequence with a delayed, complex-conjugate form of the PN sequence.

10. The device of claim 8, wherein the first detector includes a second delay product circuit configured to provide a second delay product by multiplying the received signal with a delayed, complex-conjugate form of the received signal.

11. The device of claim 8, wherein the first detector includes a sliding correlator capable of performing sliding correlation for the first delay product and the second delay product.

12. The device of claim 11, wherein the first detector includes a circuit configured to detect whether the length between the locations of two successive outputs from the sliding correlator equals the length of an OFDM symbol.

13. The device of claim 8, where in the set of phases is expressed in the form of $\exp(-j^*2\pi^*n^*\delta_i/N)$, wherein $\delta_i$ equals $(N/M)^*i$, "N" and "M" being the number of samples in a useful symbol and the PN sequence, respectively, i being an integer ranging from $-q$ to $q$, and q being an integer.

14. The device of claim 8, wherein the PN sequence is a complex conjugate of a local PN sequence.

15. The device of claim 8, wherein the first detector includes a circuit capable of detecting whether the information on symbol timing is qualified for output.

16. The device of claim 8, wherein the second detector includes a circuit capable of detecting whether the FCFO is qualified for output.

17. The device of claim 8, wherein the third detector includes a circuit capable of detecting whether the ICFO is qualified for output.

18. A device for signal synchronization in a communication system, the device comprising:
    a first detector configured to perform a first sliding correlation for a received signal and a pseudo-random noise (PN) sequence to obtain a coarse symbol timing (CST);
    a second detector configured to identify a fractional carrier frequency offset (FCFO) using the CST;
    a first multiplier configured to provide a first product by multiplying the received signal with the FCFO; and
    a third detector comprising:
        a second multiplier configured to provide a second product by sequentially multiplying the first product with one of a set of phases related to integral carrier frequency offsets (ICFOs);

a sliding correlator configured to perform a second correlation for the PN sequence and the second product, the sliding correlator being capable of sequentially providing peak values; and a peak detector configured to receive a set of peak values related to the set of phases from the sliding correlator and identify an ICFO by detecting an index number of a maximal value among the peak values.

19. The device of claim 18, wherein the first detector includes a first delay product circuit configured to provide a first delay product by multiplying the PN sequence with a delayed, complex-conjugate form of the PN sequence.

20. The device of claim 18, wherein the first detector includes a second delay product circuit configured to provide a second delay product by multiplying the received signal with a delayed, complex-conjugate form of the received signal.

21. The device of claim 18, wherein the first detector includes a sliding correlator capable of performing sliding correlation for the first delay product and the second delay product.

22. The device of claim 18, where in the set of phases is expressed in the form of $\exp(-j*2\pi*n*\delta_i/N)$, wherein $\delta_i$ equals $(N/M)*i$, "N" and "M" being the number of samples in a useful symbol and the PN sequence, respectively, i being an integer ranging from $-q$ to $q$, and q being an integer.

23. The device of claim 18, wherein the first detector includes a circuit capable of detecting whether the CST is qualified for output.

24. The device of claim 18, wherein the second detector includes a circuit capable of detecting whether the FCFO is qualified for output.

25. The device of claim 18, wherein the third detector includes a circuit capable of detecting whether the ICFO is qualified for output.

* * * * *